US006877786B2

(12) United States Patent
Gielda

(10) Patent No.: US 6,877,786 B2
(45) Date of Patent: Apr. 12, 2005

(54) THERMALLY ENERGY EFFICIENT VEHICLE

(75) Inventor: Thomas Paul Gielda, Brighton, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 114 days.

(21) Appl. No.: 09/766,972

(22) Filed: Jan. 22, 2001

(65) Prior Publication Data

US 2002/0027371 A1 Mar. 7, 2002

Related U.S. Application Data

(60) Provisional application No. 60/177,450, filed on Jan. 21, 2000.

(51) Int. Cl.$^7$ .................................................. B60N 2/44
(52) U.S. Cl. .............................. 296/39.3; 296/203.01; 296/70; 296/84.1
(58) Field of Search ................................ 296/185, 200, 296/203.01, 205, 39.3, 146.15, 70, 84.1, 96.19

(56) References Cited

U.S. PATENT DOCUMENTS

| | | | | |
|---|---|---|---|---|
| 4,973,511 A | * | 11/1990 | Farmer et al. | 428/216 |
| 5,173,148 A | * | 12/1992 | Lisec | 156/578 |
| 5,480,208 A | * | 1/1996 | Cobes et al. | 296/203.01 |
| 5,532,062 A | * | 7/1996 | Miyazaki et al. | 428/432 |
| 5,633,067 A | * | 5/1997 | Illbruck et al. | 428/128 |
| 5,865,940 A | * | 2/1999 | Li | 156/379.6 |
| 5,988,517 A | | 11/1999 | Bauer et al. | |
| 6,334,252 B1 | * | 1/2002 | Sato et al. | 29/897.2 |
| 6,391,400 B1 | * | 5/2002 | Russell et al. | 296/96.14 |
| 6,561,562 B1 | * | 5/2003 | Hesch | 296/208 |

* cited by examiner

Primary Examiner—Jason Morrow
(74) Attorney, Agent, or Firm—Brinks Hofer Gilson & Lione

(57) ABSTRACT

A thermally energy efficient vehicle includes a vehicle structure having generally interconnected structural members that form a frame for the vehicle and generally planar interconnected panels that define a shape of the vehicle. The thermally energy efficient vehicle also includes a low transmittance glass window positioned within the vehicle structure which increases a thermal resistance of the vehicle and an energy efficient thermal management system that provides exterior thermal management and interior thermal management for the vehicle, such that the energy efficient thermal management system consumes less thermal energy as a result of the increased thermal resistance of the vehicle.

16 Claims, 5 Drawing Sheets

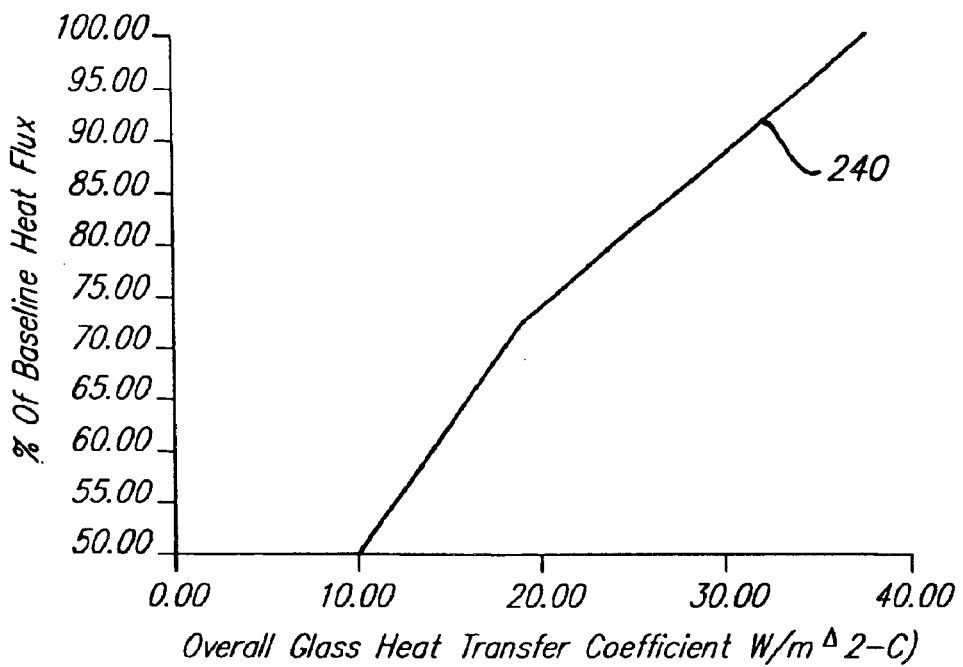
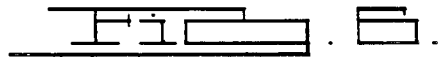
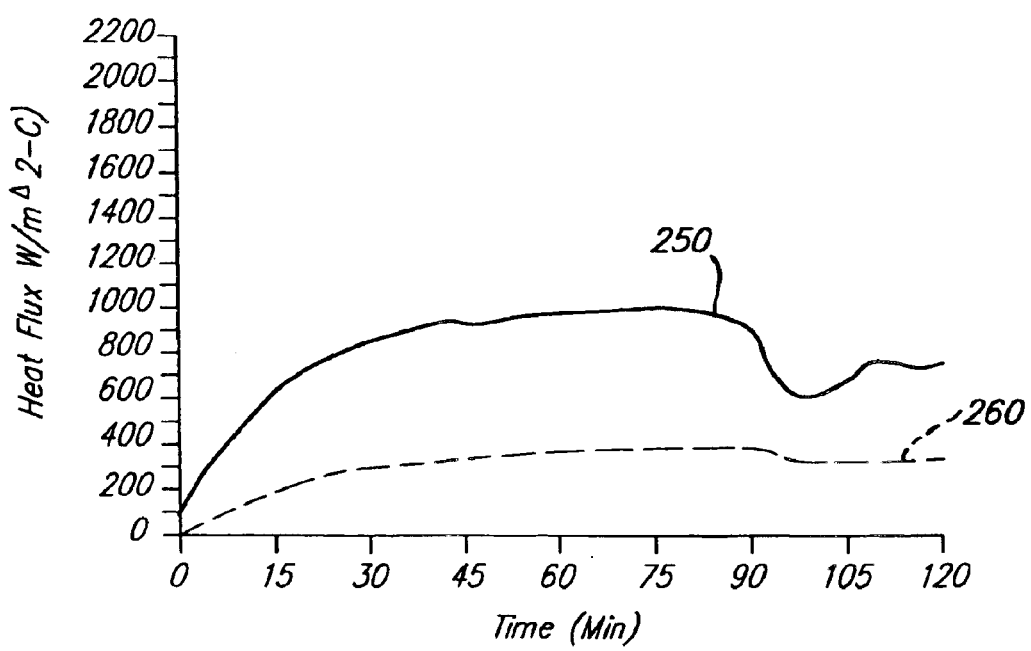
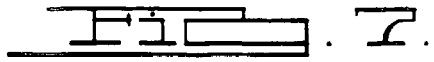

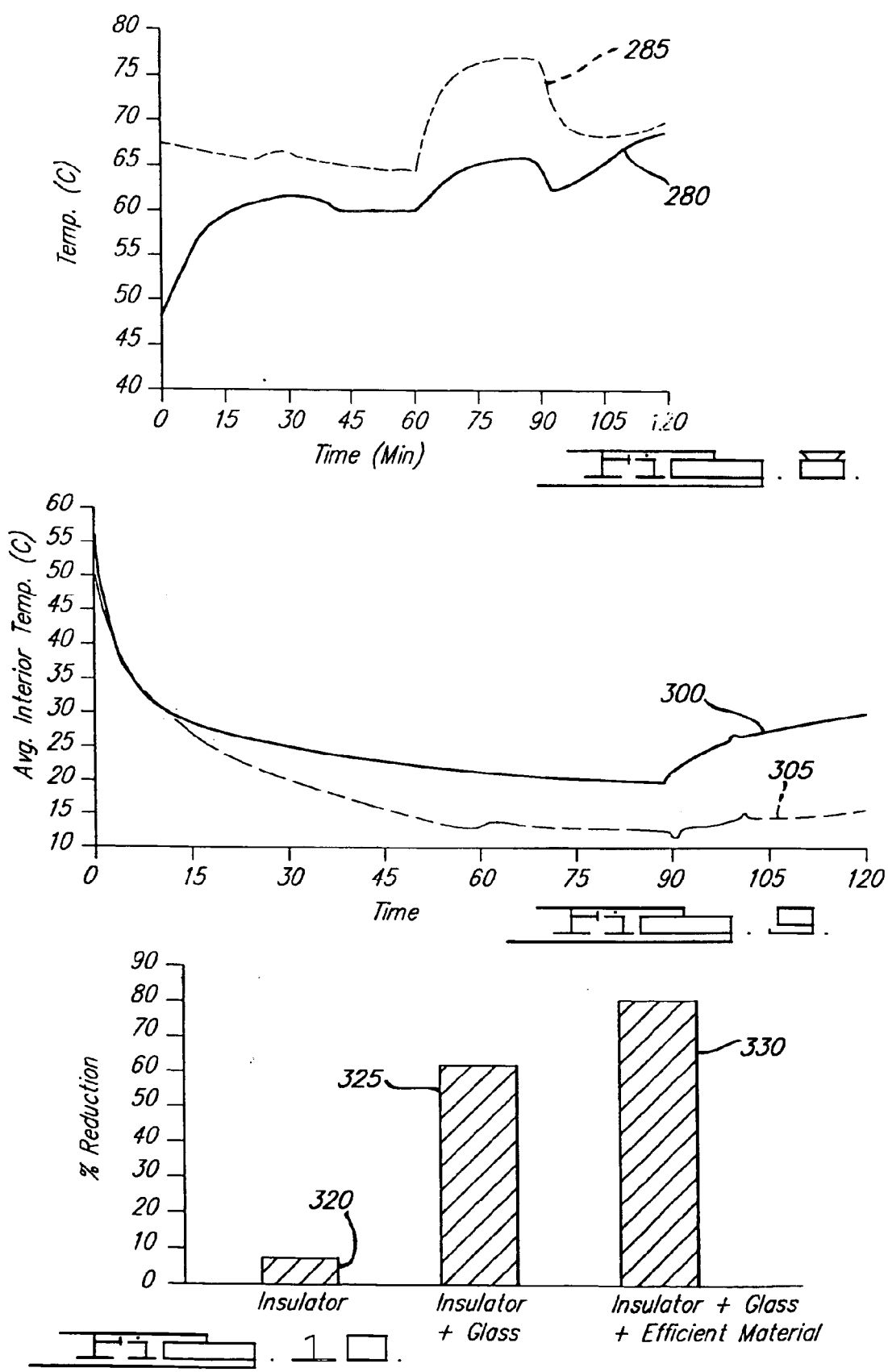

THERMALLY ENERGY EFFICIENT VEHICLE

This application claims all benefits of priority in the U.S. Provisional Patent Application 60/177,450 filed Jan. 21, 2000.

BACKGROUND OF THE INVENTION

1. Field of the Invention

The present invention relates generally to thermal energy management in a vehicle and, more specifically, to a thermally energy efficient vehicle.

2. Description of the Related Art

Vehicles, and in particular automotive vehicles, have traditionally used fuels, including petroleum-based gasoline, as a source of energy. However, the cost and availability of petroleum-based energy sources varies considerably due to economic and political factors. As a result, vehicle designers continuously seek out strategies for reducing the energy consumption of the vehicle. One example of an energy reducing strategy is to reduce the energy consumption of a vehicle system, such as a thermal management system, by increasing its energy efficiency.

The thermal management system provides powertrain cooling to maintain the temperature within an underhood compartment of the vehicle. The thermal management system also provides climate control, to maintain the temperature of an occupant compartment of the vehicle at a comfortable level, by providing heating, cooling and ventilation. The thermal management system further coordinates the interrelated challenges of removing waste heat rejected by various vehicle systems such as the engine or battery, while at the same time providing heating or cooling for the occupant compartment.

It is known that the efficiency of the thermal management system is influenced by energy losses and or gains. Examples of energy losses or gains include thermal energy transmission through the vehicle structure, solar heating, thermal mass of the vehicle, and ambient temperature. Other factors, such as vehicle weight reduction, may also influence the efficiency of the thermal management system, such as by the use of thinner glass for windows.

In the past, these energy losses were either neglected, or compensated for by enhancing the performance of the climate control system by increasing airflow capacity of the system. However, a climate control system with increased airflow capacity correspondingly increases the energy consumption of the climate control system. Thus, there is a need in the art for a thermally energy efficient vehicle that optimizes energy consumption without compromising performance of the thermal management system and occupant compartment comfort.

SUMMARY OF THE INVENTION

Accordingly, the present invention is a thermally energy efficient vehicle. The thermally energy efficient vehicle includes a vehicle structure having generally interconnected structural members that form a frame for the vehicle and generally planar interconnected panels that define a shape of the vehicle. The thermally energy efficient vehicle also includes a low transmittance glass window positioned within the vehicle structure which increases a thermal resistance of the vehicle and an energy efficient thermal management system that provides exterior thermal management and interior thermal management for the vehicle, such that the energy efficient thermal management system consumes less thermal energy as a result of the increased thermal resistance of the vehicle.

One advantage of the present invention is that a thermally energy efficient vehicle is provided that demonstrates reduced thermal energy transmission into or out of the vehicle. Another advantage of the present invention is that a thermally energy efficient vehicle is provided with improved thermal resistance. Still another advantage of the present invention is that a thermally energy efficient vehicle is provided with optimized climate control system airflow capacity and reduced energy consumption. A further advantage of the present invention is that a thermally energy efficient vehicle is provided that optimizes thermal management system interactions under various vehicle operating conditions.

Other features and advantages of the present invention will be readily appreciated, as the same becomes better understood after reading the subsequent description taken in conjunction with the accompanying drawings.

BRIEF DESCRIPTION OF THE DRAWINGS

FIG. 6 is a graph illustrating the overall effect of the low transmittance glass on glass heat flux, for the thermally energy efficient vehicle of FIG. 1, according to the present invention.

FIG. 7 is a graph illustrating the effect of the low transmittance glass on heat flux through a side window, for the thermally energy efficient vehicle of FIG. 1, according to the present invention.

FIG. 8 is a graph illustrating the effect of an energy efficient insulator on the dash panel for the thermally energy efficient vehicle of FIG. 1, according to the present invention.

FIG. 9 is a graph comparing an average interior temperature of a thermally energy efficient vehicle with a non-thermally energy efficient vehicle.

FIG. 10 is a graph illustrating a thermal load reduction of the thermally energy efficient vehicle of FIG. 1, according to the present invention.

DESCRIPTION OF THE PREFERRED EMBODIMENT(S)

Figure 1:
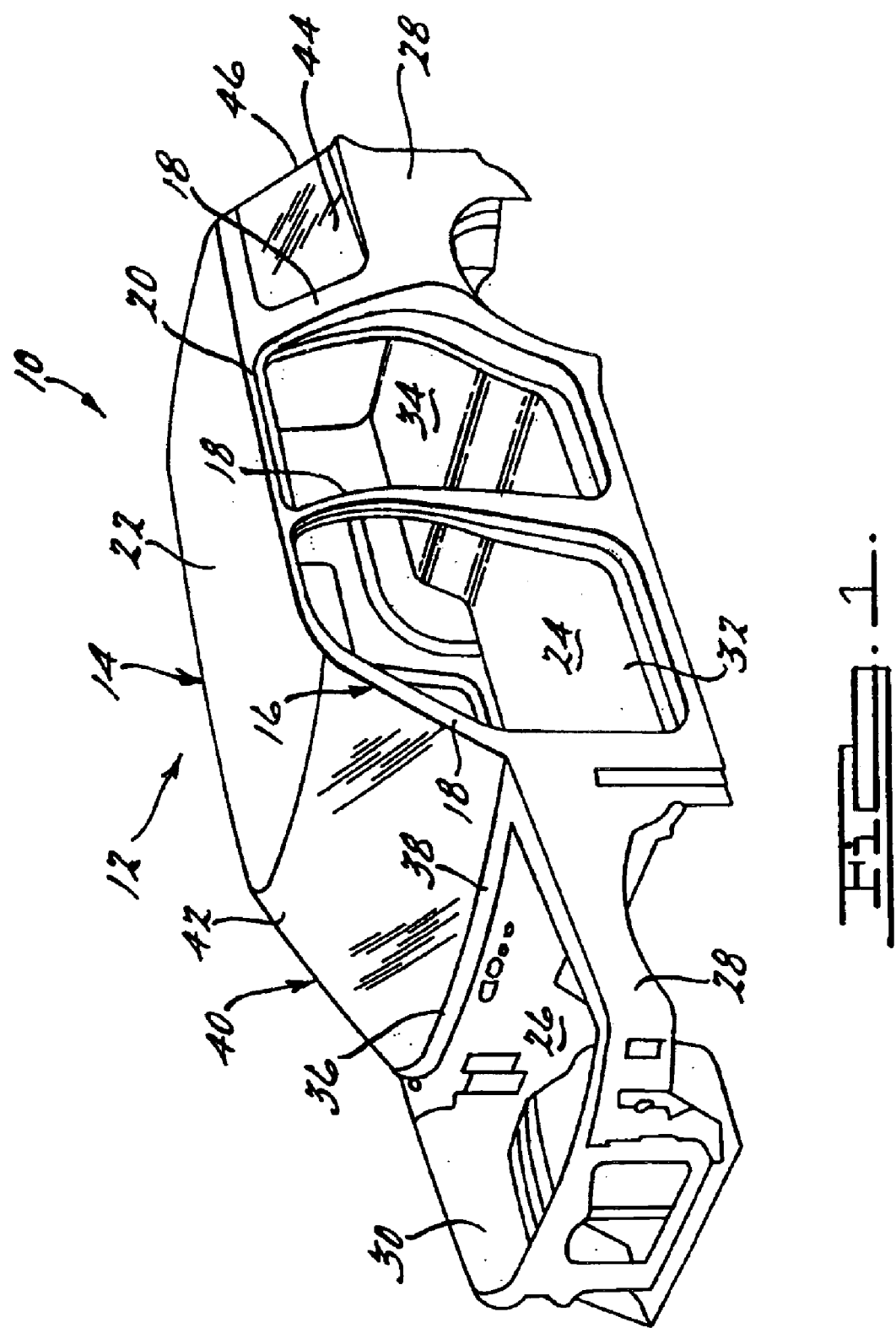
FIG. 1 is a perspective view of a thermal energy efficient vehicle, according to the present invention.

Referring to FIG. 1, one embodiment of a thermally energy efficient vehicle 10 is illustrated. The thermally energy efficient vehicle 10 includes a vehicle structure 12 that is the frame of the vehicle 10. The vehicle structure 12 is subject to thermal gains and losses from a multitude of factors that influence the efficiency of a thermal management system (to be described). An example of a thermal gain is a thermal load from a solar source, such as the sun. The sun's thermal load refers to the amount of energy transmitted through the vehicle structure 12 into the vehicle 10. An example of a thermal loss is dynamic thermal leakage through the vehicle structure 12 to the environment. Advantageously, the thermal energy efficient vehicle 10 has improved thermal resistance to reduce thermal energy transmission, so that a thermal load requirement of the thermal management system is reduced.

The vehicle structure 12 includes a frame portion (not shown) having a pair of rails (not shown) disposed in a spaced relationship to one another and defining a longitudinal axis of the vehicle 10. The vehicle structure 12 also includes a front axle (not shown) and a rear axle (not shown) disposed in a spaced relationship to one another and extending substantially transverse to the longitudinal axis of the vehicle 10. It should be appreciated that wheels are operatively mounted to the front axle and real axle, for rolling engagement with a surface, such as a road.

The vehicle structure 12 also includes a vehicle body 14 which defines the shape of the vehicle 10, as is known in the art, and includes structural members 16 typically associated with the vehicle body 14. For example, the vehicle body 14 includes generally beam shaped structural members 16 that form a load bearing structure for the thermally energy efficient vehicle 10, such as a pillar 18 or a roof rail 20, as is known in the art. The vehicle body 14 further includes generally planar structural members interconnecting the load bearing structural members, such as a roof 22, a floor 24, and a dash panel 26.

The vehicle body 14 includes a plurality of generally planar interconnected body panels 28 secured thereto the frame using a conventional means, such as welding or fastening. Advantageously, the body panels 28 further define an aesthetically pleasing shape of the thermally energy efficient vehicle 10. The vehicle structure 12 is divided into sections, such as a front storage compartment 30, an occupant compartment 32, and a rear storage compartment 34. The front storage compartment 30, referred to as an engine compartment, houses the mechanisms for operating the vehicle 10, such as the powertrain (to be described). The occupant compartment 32 provides a shelter for a vehicle occupant, and includes seats (not shown), control mechanisms for operating the vehicle (not shown), and control mechanisms for maintaining the comfort of the occupant compartment (not shown). The rear storage compartment 34, as is known in the art, provides for storage, and forms the shape of the rear of the vehicle 10. It should be appreciated that the occupant compartment 32 and rear storage compartment 34 may be integral, as in the example of a sports utility type vehicle.

The vehicle structure 12 includes the use of a thermally efficient structural material 36 in a portion thereof. Advantageously, the thermally efficient structural material 36 reduces the thermal mass of the thermally energy efficient vehicle 10 by reducing the thermal energy stored by the vehicle structure 12. The thermal mass of the vehicle structure 12 refers to the amount of heat stored by the vehicle structure 12. For example, in the summer, the vehicle structure 12 retains heat, and the heat retention of the vehicle structure 12 impacts the cooling efficiency within the occupant compartment 32. The use of a thermally efficient structural material 36 improves thermal energy transmission so that less energy is required to heat or cool the thermally energy efficient vehicle 10.

It should be appreciated that the vehicle structure 12 is typically made of steel, which has a greater mass and a higher specific heat than other materials. An example of a thermally efficient structural material 36 is aluminum, which has a low specific heat. Advantageously, utilizing aluminum in a portion of the vehicle structure 12, such as a seat frame (not shown), reduces the thermal mass of the vehicle structure 12. Another example of a thermally efficient structural material 36 is a graphite/composite material having comparable thermal properties of magnesium. The graphite/composite material may be used in a structural member 16 such as a cross car beam, 38 in place of steel.

Figure 3:
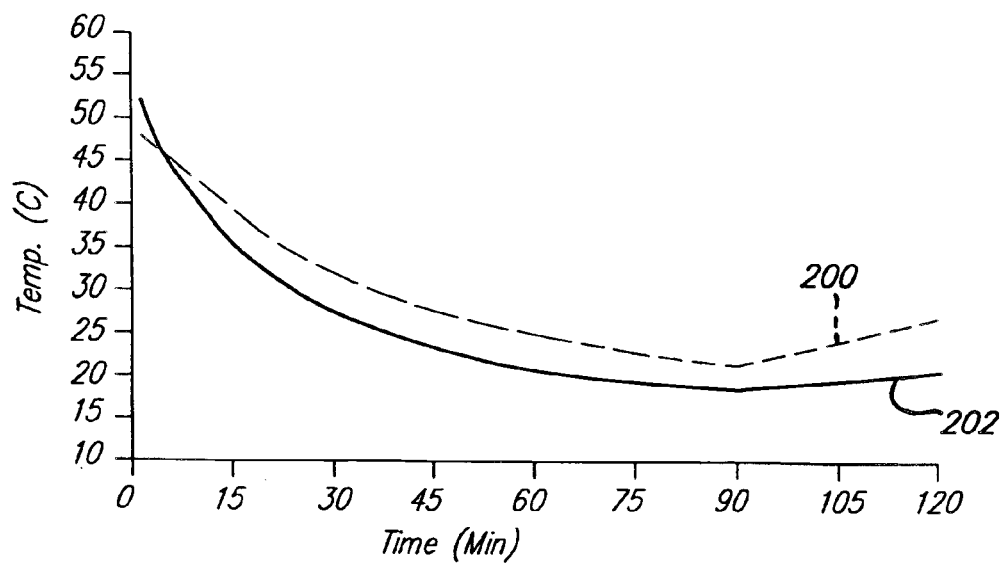
FIG. 3 is a graph illustrating an average surface temperature of a cross-car beam made from a thermally efficient structural material during a standard air conditioning test.

Referring to FIG. 3, an example of the effect of a thermally efficient structural material 36 in a thermally energy efficient vehicle is illustrated graphically. In this example, the average surface temperature of a cross-car beam 38 was measured during a typical air conditioning system evaluation. The average surface temperature of a steel crossbeam is shown at 200. The average surface temperature of a cross beam made from a thermally efficient structural material is shown at 202. In comparing the rate of change of temperature, it is apparent that the thermally efficient structural material 36 has a faster rate of temperature change. As a result, the cross-car beam 38 behaves as a thermal storage device. By reducing the thermal mass of the cross-car beam 38, the amount of energy stored by the cross-car beam 38 is correspondingly reduced. The net result is a faster cool-down of the thermally energy efficient vehicle 10 as compared to a non-thermally energy efficient vehicle.

The vehicle structure 12 also includes a window 40, such as a windshield 42, a side window 44 or a rear window 46. The window 40 is a significant source of thermal energy transmission, since convective heat loss is very high. For example, as the vehicle speed increases, convective cooling and/or heating through the window 40 becomes a dominant source of convective heat loss and/or gain. At the same time, solar thermal load gain through the window 40, is less than convective heat loss.

Figure 4:
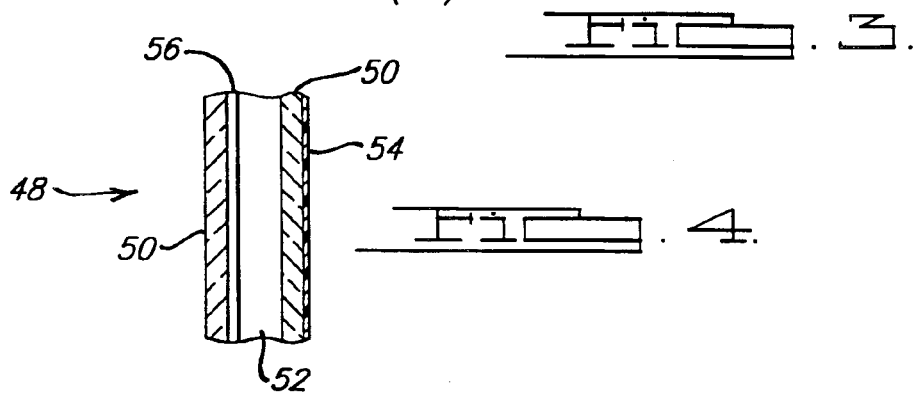
FIG. 4 is a side view of a low transmittance glass for the thermally energy efficient vehicle of FIG. 1, according to the present invention.

The thermally energy efficient vehicle 10 utilizes a low transmittance glass 48 as shown in FIG. 4 for the window portions of the thermally energy efficient vehicle 10. Preferably, the low transmittance glass 48 is a dual pane glass consisting of two parallel sheets of glass 50 separated by an air gap 52. An air gap 52 is a known insulator. In this example, the air gap 52 is 2 mm wide. The low transmittance glass 48 has improved thermal resistance characteristics, as compared to a single pane of glass traditionally used in non-thermally efficient vehicles. The low transmittance glass 48 also reduces the thermal radiation entering the occupant compartment 32 through a window 40, while reducing heat loss from conduction or convection processes. Preferably, the low transmittance glass 48 includes a solar reflective film 54 secured to a surface of the glass sheet 50. The film 54 reduces the load on a climate control system (to be described) by reducing the solar radiation into the occupant compartment. For example, 3M Corporation manufactures a solar reflective film 54 having a solar transmission of 43.3%.

The low transmittance glass 48 may also include a desiccant material 56 positioned in the air gap 52 between the glass sheets 50 to trap water vapor, as is known in the art.

Figure 5:
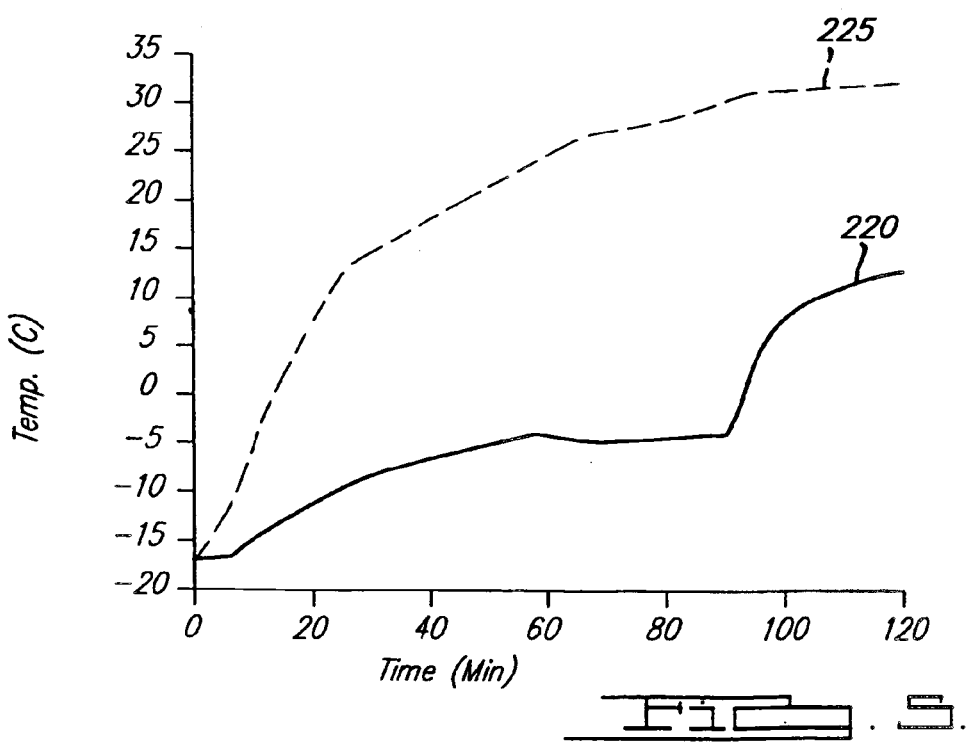
FIG. 5 is a graph illustrating an inside surface temperature of a low transmittance glass rear window for the thermally energy efficient vehicle of FIG. 4, according to the present invention.

Referring to FIGS. 5 through 7, the thermal transmission benefit of the low transmittance glass 48 is illustrated graphically. In this example, the window 40 is a windshield 42 made from a glass/polycarbonate composite material having increased thermal resistance but less weight than traditional bi-laminate glass. In FIG. 5, the impact of the low transmittance glass 48 on an overall heat transfer coefficient is illustrated. The benefit of the increased insulating value of the low transmittance glass 48 on the overall heat transfer coefficient is illustrated at 220, versus a non-insulated glass at 225.

In FIG. 6, the benefit of the increased resistance value of the low transmittance glass 48 is illustrated graphically. The resistance value is changed by varying the overall heat transfer coefficient of the low transmittance glass 48 relative to the heat flux, as shown at 240. The heat transfer coefficient of the low transmittance glass 48 includes the conduction coefficient of the glass solid and the external convection coefficient. It should be appreciate that the convection coefficient on the inside glass structure can be determined through a computer aided engineering analysis, such as computational fluid dynamics.

In FIG. 7, the heat flux of the low transmittance glass 48 as compared to a typical glass is illustrated graphically. In this example, the window is a passenger side window 44, and the heat flux is measured over time. The heat flux or change of a typical glass window over time is shown at 250. The temperature flux of the low transmittance glass 48 over time is shown at 260. It should be appreciated that the average heat flux through the side window 44 was significantly reduced by using the low transmittance glass 48 in the thermally energy efficient vehicle 10 versus a non-thermally energy efficient vehicle. Also, the non-thermally energy efficient vehicle side window had a large gradient in heat flux. It should be appreciated that an inside surface temperature of the low transmittance glass 48 is higher that for a non-low transmittance glass. Therefore, the low transmittance glass 48 is subject to little or no fogging, since the inside surface temperature remains warm.

The thermally energy efficient vehicle 10 also includes an energy efficient insulator 58 (shown in FIG. 2) to insulate the vehicle 10 from dynamic thermal energy transmission. It should be appreciated that the interconnected nature of the vehicle body structure 12 creates inherent pathways for thermal energy leakage. Also, the vehicle body structure 12 itself has poor insulation qualities. It should be appreciated that insulator (not shown) currently used in vehicles, such as between the dash panel and the occupant compartment, or the floor and the occupant compartment, are used primarily for reducing the transmission of noise and vibration into the occupant compartment 32. Advantageously, the energy efficient insulator 58 is thermally efficient and also provides an acoustic barrier. Preferably, the energy efficient insulator 58 is a lightweight gas filled panel or bag, as in known in the art. The energy efficient insulator 58 is attached to an inside portion of the vehicle structure 12, such as by an adhesive. In this example, the gas-filled panel insulation utilizes argon as a filler gas for the panel. Advantageously, the energy efficient insulator 58 improves the thermal resistance of the thermally energy efficient vehicle 10, resulting in higher outside surface temperatures.

Referring to FIG. 8, the advantage of using an energy efficient insulator 58 on dynamic vehicle body thermal transmission is illustrated graphically. The outside surface temperature (engine compartment side) of the dash panel 26 for a vehicle without the energy efficient insulator is shown at 280. The outside surface temperature of the dash panel 26 for a thermally energy efficient vehicle 10 with the energy efficient insulator 58 is shown at 285. Advantageously, improving the insulating ability of the thermally energy efficient vehicle 10 results in higher sheet metal temperatures due to a higher thermal resistance. This reduces the transfer of heat from the engine compartment to the occupant compartment 32, thereby keeping the occupant compartment 32 cooler.

Figure 2:
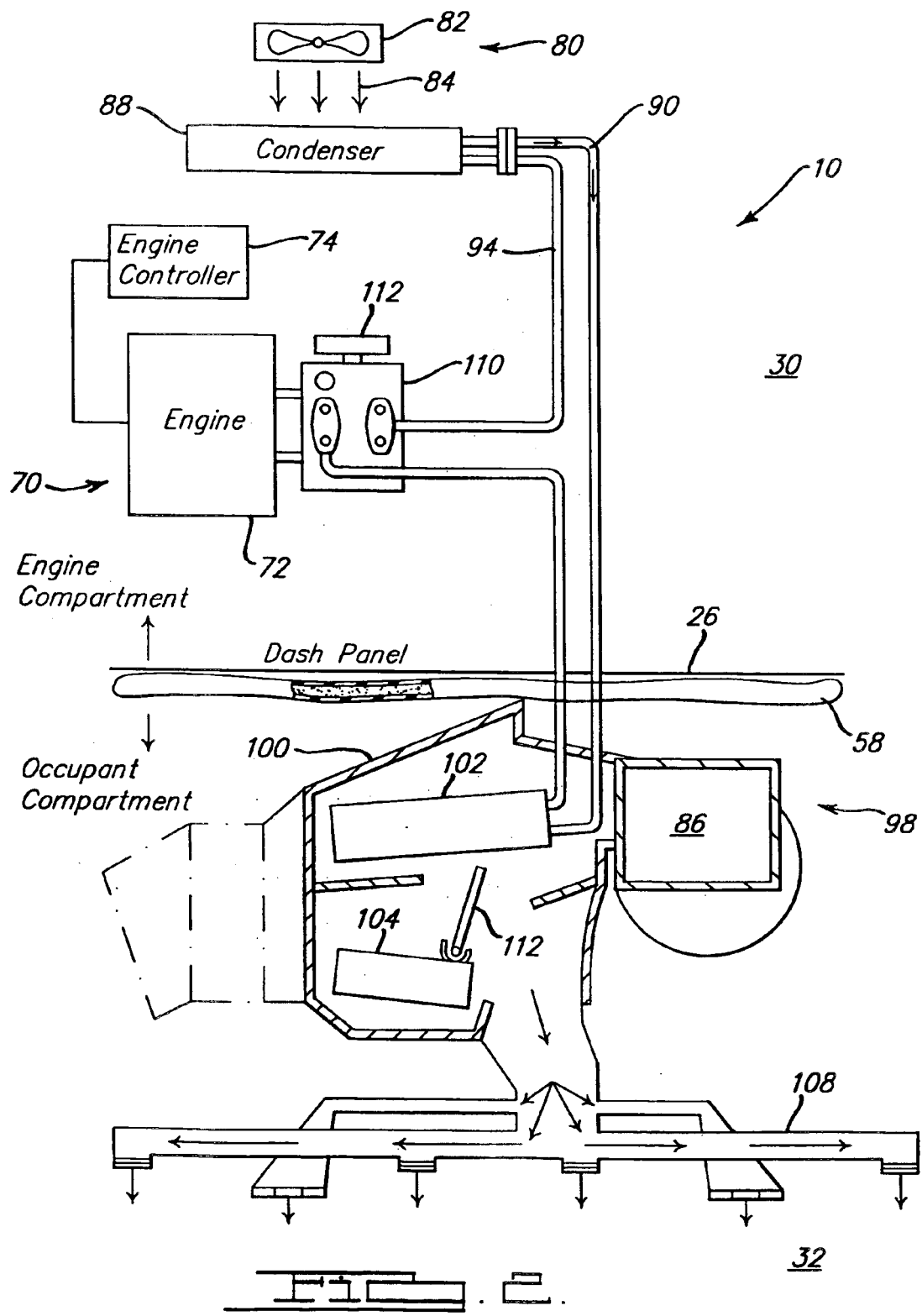
FIG. 2 is a block diagram of a thermal management system for the thermal energy efficient vehicle of FIG. 1, according to the present invention.

Referring to FIG. 2, the thermally energy efficient vehicle 10 includes a power train 70, such as a heat engine 72, operating on a hydrocarbon-based or fossil fuel, although other vehicle types are contemplated. It should be appreciated that power from the engine 72 is used to operate the thermal energy management system, in a manner to be described. The engine 72 is also operatively connected to a transmission (not shown), as is known in the art, to transmit engine rotation and power to a drive wheel (not shown). Thus, the transmission enables the thermally energy efficient vehicle 10 to accelerate over its speed range through predetermined gear ratios, while the engine 72 functions within a predetermined operating range. It should be appreciated that the engine 72 is in communication with an engine controller 74 that manages and controls its operation. The engine controller 74 is also in communication with a thermal management system 80.

The thermally energy efficient vehicle 10 includes an energy efficient thermal management system 80. It should be appreciated that the energy efficient thermal management system 80 receives operative power from sources including the engine 72. The thermal management system 80 generally provides both exterior thermal management and interior thermal management for the vehicle. Exterior thermal management provides powertrain cooling within the front storage compartment 30. Interior thermal management provides for heating, ventilation and air conditioning of an occupant compartment 32 portion of the thermally energy efficient vehicle 10, and is referred to as climate control. Advantageously, interior thermal management provides for a comfortable interior temperature of the occupant compartment 32, and good visibility through the windshield 42 and other windows 40 of the thermally energy efficient vehicle 10. It should be appreciated that the interior temperature of the thermally energy efficient vehicle 10 may be affected by factors such as occupant compartment temperature, ambient temperature, external airflow heat radiation, and thermal resistance.

The energy efficient thermal management system 80 includes a fan 82 positioned behind a front grill (not shown) portion of the thermally energy efficient vehicle 10. The fan draws air 84 from outside the vehicle 10 into the front storage compartment 30 to provide cooling of powertrain components, such as the engine 72. It is contemplated that less front-end airflow is required to maintain climate control system performance for the thermally energy efficient vehicle 10. Therefore, a smaller fan 82 is specified, so that front end fan power consumption may be reduced, such as by forty percent (40%).

The thermal management system 80 further includes a radiator (not shown) positioned behind the front grill. The radiator provides powertrain cooling by the rejection of waste heat from the engine 72 through a coolant fluid (not shown). In this example, the coolant fluid is a mixture of antifreeze and water.

The energy efficient thermal management system 80 also includes a coolant pump (not shown), as is known in the art, to distribute the coolant fluid throughout the thermal management system 80 throughout a series of ducts (not shown). The control of the coolant fluid through the ducts is by a valve (not shown) disposed therein. It is contemplated that the energy efficient thermal management system 80 utilizes a smaller pump, since there is less thermal energy transmission to compensate for.

The energy efficient thermal system 80 includes a condenser 88, as is known in the art, positioned behind the front grill. The condenser 88 facilitates a thermodynamic reaction between air 84 and a refrigerant 90 in a gaseous state, whereby the refrigerant 90 changes from a gas to a liquid through the transfer of heat from the refrigerant 90 to the air. The heated air is vented to the outside air, preferably at constant pressure, and the refrigerant 90, now in a liquid state, flows from the condenser 28 into the interior thermal management system, as will be described. Preferably, the energy efficient thermal management system 80 is typical of a vapor compression refrigeration cycle for a closed loop system, as is known in the art. The system 80 includes a compressor 110, which operatively compresses the refrigerant 90 a predetermined amount to increase the pressure of the refrigerant 90. The system 80 includes a clutch operatively connected to the compressor 110 to turn the compressor 110 "on" and "off", as is understood in the art.

The thermal management system 80 also includes an airflow handling system, referred to in the art as a heating, ventilation and air conditioning (HVAC) air-handling assembly 98, for providing climate control within the occupant compartment 32. The HVAC air-handling assembly 98 conditions a flow of air by heating or cooling the airflow and distributing the flow of conditioned air to the interior of the occupant compartment 32 of the thermally energy efficient vehicle 10. It should be appreciated that, in this embodiment, the HVAC air-handling assembly 98 is positioned on the occupant compartment side of a dash panel 26, below an instrument panel. Also, in this embodiment, the HVAC air handling assembly 98 includes a case 100, having a preferred architecture, to package the individual component parts of the HVAC air-handling assembly 98.

The HVAC assembly 98 includes an evaporator core 102 that conditions the flow of air within the HVAC assembly 98. The evaporator 102 cools and dehumidifies the air by the thermodynamic transfer of heat from the airflow to the refrigerant 90, as is known in the art. The conditioned air may be diverted into a heater core 104, to heat the air.

The heater core 104 heats a flow of air to be conditioned by the thermodynamic transfer of heat from the coolant fluid. The heated air is distributed to the occupant compartment 32 via a series of airflow ducts 108, as is known in the art. Since the thermally energy efficient vehicle 10 requires less airflow, it is contemplated that the evaporative heater core size and heater core size can also be reduced to achieve a weight savings with a minimal effect on energy consumption.

The energy efficient thermal management system 80 further includes a control mechanism (not shown) that manages and controls the operation of the thermal management system 10 in a manner to be described.

Preferably, the energy efficient thermal management system 80 includes other component parts, such as supplemental heat sources (not shown), actuators (not shown), air inlet ducts (not shown), blower assembly 86, doors 112 and switches (not shown), which are conventional and well known in the art to operatively maintain the thermal environment of the thermally energy efficient vehicle 10.

In operation, the energy efficient thermal management system 80 manages airflow throughout the system. The energy efficient thermal management system utilizes energy supplied by power sources, such as the engine 72, to generate, manage and transfer the airflow. In general, energy consumption and airflow distribution are directly related. The capacity of the energy efficient thermal management system 80 is based upon the system's maximum thermal load. By reducing the thermal load, a system with reduced thermal energy consumption may be utilized. For example, a climate control system having a one kilowatt (1 KW) energy consumption capacity can be utilized versus a typical five kilowatt (5 KW) system for a medium-sized vehicle.

It should be appreciated that the high power consumption typically required for initially cooling the occupant compartment 32 under high ambient temperature operating conditions, may be reduced by the improving the resistance property of the thermally energy efficient vehicle 10. For example, the interior temperature is lower after a predetermined soak period if the vehicle has a height resistance value.

Referring to FIG. 9, the performance of a thermally energy efficient vehicle 10, relative to a non-thermally energy efficient vehicle for a standard air conditioning test is illustrated graphically. The temperature of the non-thermally energy efficient management system over time is illustrated at 300. The temperature of the thermally energy efficient vehicle 10, with an energy efficient thermal management system 80 over time is illustrated at 305. Advantageously, a reduction in air conditioning power consumption of ten to fifty percent (10–50%) is foreseeable for the thermally energy efficient vehicle 10.

Referring to FIG. 10, the thermal load reduction of the energy efficient thermal management system 80 during a standard air conditioning test is illustrated for the thermally energy efficient vehicle 10. The percent reduction is shown incrementally for the energy efficient insulator 58 at 320; low transmittance glass 48 and energy efficient insulator 58 at 325; and low transmittance glass 48, energy efficient insulator 58 and thermally efficient structural material 36 at 330. As a result of the reduction in thermal load, the thermal management system power consumption is reduced, and a smaller capacity system can be used by the thermally energy efficient vehicle 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A thermally energy efficient vehicle comprising:
   a vehicle structure, wherein said vehicle structure includes generally interconnected structural members that form a frame for the vehicle and generally planar interconnected panels that define a shape of the vehicle, wherein a thermally efficient structural material is utilized for said structural members to reduce a thermal mass of said structural members;
   a low transmittance glass window positioned within window portions of said vehicle structure, wherein said low transmittance glass window increases a thermal resistance of the vehicle;
   an energy efficient insulator attached to an inside portion of said vehicle structure to increase a thermal resistance of the vehicle, the energy efficient insulator including a first wall surface and a second wall surface defining a gas-filled cavity, the gas-filled cavity extending substantially completely along the first and second wall surfaces; and
   an energy efficient thermal management system providing exterior thermal management for powertrain cooling within an engine compartment and interior thermal management for climate control within an occupant compartment for the vehicle, wherein said energy efficient thermal management system consumes less thermal energy as a result of the increased thermal resistance of the vehicle.

2. A thermally energy efficient vehicle as set forth in claim 1 wherein said energy efficient insulator provides a thermal barrier and an acoustic barrier.

3. A thermally energy efficient vehicle as set forth in claim 1 wherein said low transmittance glass window includes two parallel sheets of glass defining a second gas-filled cavity, to improve a thermal resistance of the low transmittance glass.

4. A thermally energy efficient vehicle as set forth in claim 3 wherein said low transmittance glass includes a solar reflective film attached to an outside surface of one of the two parallel sheets of glass.

5. A thermally energy efficient vehicle as set forth in claim 3 wherein said low transmittance glass includes a desiccant material disposed within the second gas-filled cavity.

6. A thermally energy efficient vehicle as set forth in claim 1 wherein said low transmittance glass window is made from a glass/polycarbonate composite material.

7. A thermally energy efficient vehicle as set forth in claim 1 wherein a thermal energy consumption capacity of the energy efficient thermal management system is reduced by increasing the thermal resistance of the vehicle.

8. A thermally energy efficient vehicle comprising:
   a vehicle structure, wherein said vehicle structure includes generally interconnected structural members that form a frame for the vehicle and generally planar interconnected panels that define a shape of the vehicle, wherein a thermally efficient structural material is utilized for said structural members to reduce a thermal mass of the vehicle;
   a low transmittance glass window positioned within window portions of said vehicle structure, wherein said low transmittance glass window includes; two parallel sheets of glass defining a window gas-filled cavity, to increase a thermal resistance of the vehicle;
   an energy efficient insulator attached to an inside portion of said vehicle structure to increase a thermal resistance of the vehicle, the energy efficient insulator including a first wall surface and a second wall surface defining an insulator gas-tilled cavity, the insulator gas-filled cavity extending substantially completely along the first and second wall surfaces; and
   an energy efficient thermal management system providing exterior thermal management for powertrain cooling within an engine compartment and interior thermal management for climate control within an occupant compartment for the vehicle, wherein a thermal energy consumption capacity of said energy efficient thermal management system is decreased since said energy efficient thermal management system consumes less thermal energy resulting from the increased thermal resistance and reduced thermal mass of the vehicle.

9. A thermally energy efficient vehicle as set forth in claim 8 wherein said energy efficient insulator provides a thermal barrier and an acoustic barrier.

10. A thermally energy efficient vehicle as set forth in claim 8 wherein said low transmittance glass includes a solar reflective film attached to an outside surface of one of the two parallel sheets of glass.

11. A thermally energy efficient vehicle as set forth in claim 8 wherein sold low transmittance glass includes a desiccant material disposed within the window gas-filled cavity.

12. A thermally energy efficient vehicle as set forth in claim 8 wherein said low transmittance glass window is made from a glass/polycarbonate composite material.

13. A thermally energy efficient vehicle as set forth in claim 1, wherein the first wall surface and the second wall surface are substantially parallel with each other.

14. A thermally energy efficient vehicle as set forth in claim 13, wherein the gas-filled cavity includes argon.

15. A thermally energy efficient vehicle as set forth in claim 8, wherein the first wall surface and the second wall surface are substantially parallel with each other.

16. A thermally energy efficient vehicle as set forth in claim 15, wherein the insulator gas-filled cavity includes argon.

* * * * *

UNITED STATES PATENT AND TRADEMARK OFFICE
CERTIFICATE OF CORRECTION

PATENT NO. : 6,877,786 B2
DATED : April 12, 2005
INVENTOR(S) : Thomas Paul Gielda It is certified that error appears in the above-identified patent and that said Letters Patent is hereby corrected as shown below:

Column 9,
Line 38, immediately after "window includes" delete ";" (semicolon).

Column 10,
Line 3, delete "gas-tilled" and substitute -- gas filled --.
Line 24, after "wherein" delete "sold" and substitute -- said --.

Signed and Sealed this

Twenty-fourth Day of January, 2006

JON W. DUDAS
*Director of the United States Patent and Trademark Office*